United States Patent
Georges et al.

(10) Patent No.: US 9,940,927 B2
(45) Date of Patent: Apr. 10, 2018

(54) MULTIPLE PASS AUTOMATIC SPEECH RECOGNITION METHODS AND APPARATUS

(71) Applicant: Nuance Communications, Inc., Burlington, MA (US)

(72) Inventors: Munir Nikolai Alexander Georges, Aachen (DE); Stephan Kanthak, Aachen (DE)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 14/364,156

(22) PCT Filed: Aug. 23, 2013

(86) PCT No.: PCT/US2013/056403
§ 371 (c)(1),
(2) Date: Jun. 10, 2014

(87) PCT Pub. No.: WO2015/026366
PCT Pub. Date: Feb. 26, 2015

(65) Prior Publication Data
US 2015/0058018 A1 Feb. 26, 2015

(51) Int. Cl.
*G10L 15/00* (2013.01)
*G10L 15/08* (2006.01)
(Continued)

(52) U.S. Cl.
CPC .......... *G10L 15/08* (2013.01); *G10L 15/183* (2013.01); *G10L 15/1815* (2013.01); *G10L 15/30* (2013.01); *G10L 15/32* (2013.01)

(58) Field of Classification Search
CPC ....... G10L 15/065; G10L 15/30; G10L 15/32; G10L 15/00
(Continued)

(56) References Cited

U.S. PATENT DOCUMENTS 5,241,619 A * 8/1993 Schwartz ............... G10L 15/08
704/200
6,018,708 A * 1/2000 Dahan .................. G10L 15/26
704/235
(Continued)

FOREIGN PATENT DOCUMENTS

| WO | WO 02/29783 A1 | 4/2002 |
|---|---|---|
| WO | WO 2007/019318 A2 | 2/2007 |
| WO | WO 2012/145519 A1 | 10/2012 |

OTHER PUBLICATIONS

Extended European Search Report for European Application No. 13861533.1 dated Apr. 20, 2015.
(Continued)

*Primary Examiner* — Michael Colucci
(74) *Attorney, Agent, or Firm* — Wolf, Greenfield & Sacks, P.C.

(57) ABSTRACT

In some aspects, a method of recognizing speech that comprises natural language and at least one word specified in at least one domain-specific vocabulary is provided. The method comprises performing a first speech processing pass comprising identifying, in the speech, a first portion including the natural language and a second portion including the at least one word specified in the at least one domain-specific vocabulary, and recognizing the first portion including the natural language. The method further comprises performing a second speech processing pass comprising recognizing the second portion including the at least one word specified in the at least one domain-specific vocabulary.

20 Claims, 4 Drawing Sheets

(51) Int. Cl.
G10L 15/18 (2013.01)
G10L 15/32 (2013.01)
G10L 15/30 (2013.01)
G10L 15/183 (2013.01)

(58) Field of Classification Search
USPC .............. 704/257, 231, 235, 200, 243, 246
See application file for complete search history.

(56) References Cited

U.S. PATENT DOCUMENTS

| | | | | |
|---|---|---|---|---|
| 6,092,044 | A * | 7/2000 | Baker | G10L 15/063 704/254 |
| 6,212,498 | B1 * | 4/2001 | Sherwood | G10L 15/063 704/235 |
| 6,704,710 | B2 | 3/2004 | Strong | |
| 6,980,954 | B1 * | 12/2005 | Zhao | G10L 15/08 704/251 |
| 8,386,251 | B2 * | 2/2013 | Strom | G10L 15/065 379/406.01 |
| 8,457,959 | B2 * | 6/2013 | Kaiser | G10L 15/24 704/231 |
| 9,009,049 | B2 * | 4/2015 | Liu | G10L 15/32 704/231 |
| 9,224,387 | B1 * | 12/2015 | Slifka | G10L 15/00 |
| 9,640,175 | B2 * | 5/2017 | Liu | G10L 15/063 |
| 2003/0065511 | A1 * | 4/2003 | Franco | G10L 15/065 704/243 |
| 2005/0055210 | A1 * | 3/2005 | Venkataraman | G10L 15/065 704/255 |
| 2011/0004462 | A1 | 1/2011 | Houghton et al. | |
| 2011/0060587 | A1 * | 3/2011 | Phillips | G10L 15/30 704/235 |
| 2012/0101817 | A1 * | 4/2012 | Mocenigo | G10L 15/063 704/231 |
| 2012/0253799 | A1 | 10/2012 | Bangalore et al. | |
| 2014/0142945 | A1 * | 5/2014 | Fry | G10L 15/26 704/254 |
| 2015/0006166 | A1 * | 1/2015 | Schmidt | G10L 15/30 704/231 |

OTHER PUBLICATIONS

Georges et al., Accurate client-server based speech recognition keeping personal data on the client. 2014 IEEE International Conference on Acoustics, Speech and Signal Processing (ICASSP). May 4, 2014: 3271-5.
Venkataraman et al., An architecture for rapid retrieval of structured information using speech with application to spoken address recognition. Automatic Speech Recognition and Understanding. Nov. 30, 2003: 459-64.
International Search Report and Written Opinion for PCT/US2013/056403 dated May 22, 2014.
Allauzen et al., 3-Way Composition of Weighted Finite-State Transducers. CIAA ser Lecture Notes in Computer Science. Ibarra et al., eds. Springer. 2008;5148:262-73.
Allauzen et al., N-Way Composition of Weighted Finite-State Transducers. Int. J. Found. Comput. Sci. 2009;20(4):613-627.
Beaujard et al., Evaluation of a class-based language model in a speech recognizer. Jan. 18, 1999. 6 pages.
Brown et al., Class-based n-gram models of natural language. Computational Linguistics. 1992;18(4):467-79.
Brugnara et al., Dynamic Language Models for Interactive Speech Applications. Eurospeech. ISCA. 1997. 4 pages.
Dixon et al., A Specialized WFST Approach for Class Models and Dynamic Vocabulary. Interspeech. 2012. 4 pages.
Dolfing et al., Unified language-modeling using finite-state transducers with first applications. Interspeech 2004—ICSLP, 8th International Conference on Spoken Language Processing, Jeju Island, Korea, Oct. 4-8, 2004. 4 pages.
Galescu et al., Rapid Language Model Development for New Task Domains. Proc First International Conference on Language Resources and Evaluation (LREC). 1998. 6 pages.
Georges et al., Transducer-based Speech Recognition with Dynamic Language Models. Proceedings of Interspeech. Lyon, France. Aug. 25-29, 2013. 5 pages.
Gillett et al., A Language Model Combining Trigrams and Stochastic Context-Free Grammars. ICSLP. ISCA. 1998.4 pages.
Hetherington, A multi-pass, dynamic-vocabulary approach to real-time, large-vocabulary speech recognition. Interspeech. ISCA. 2005:545-48.
Hori et al., Fast on-the-fly composition for weighted finite-state transducers in 1.8 million-word vocabulary continuous speech recognition. Interspeech 2004—ICSLP, 8th International Conference on Spoken Language Processing, Jeju Island, Korea, Oct. 4-8, 2004. Conference Paper. 4 pages.
Hori et al., Generalized fast on-the-fly composition algorithm for WFST-based speech recognition. Interspeech 2005—Eurospeech, 9th European Conference on Speech Communication and Technology, Lisbon, Portugal, Sep. 4-8, 2005. Conference Paper. 4 pages.
Karttunen, The Replace Operator. 1994. 8 pages.
Klakow et al., OOV-detection in large vocabulary system using automatically defined word-fragments as fillers. Sixth European Conference on Speech Communication and Technology, EUROSPEECH 1999, Budapest, Hungary, Sep. 5-9, 1999.
Kneser et al., Improved backing-off for M-gram language modeling. 1995 International Conference on Acoustics, Speech, and Signal Processing. ICASSP-95. May 9-12, 1995;1:181-184.
McDonough et al., An algorithm for fast composition of weighted finite-state transducers. IEEE Workshop on Automatic Speech Recognition & Understanding, 2007. ASRU. 2007:461-66.
Mohri , Chapter 9. Local Grammar Algorithms. Inquiries into Words, Constraints and Contexts. Arppe et al. (Eds). Stanford University. CSLI Publications. 2005:84-93.
Mohri et al., Weighted Automata in Text and Speech Processing. ECAI 96. 12th European Conference on Artificial Intelligence. 1996:46-50.
Mohri et al., Weighted finite-state transducers in speech recognition. Computer Speech & Language. 2002;16:69-88.
Mohri, Weighted Finite-State Transducer Algorithms an Overview. Physica-Verlag. 2004. 13 pages.
Moore et al., Combining Linguistic and Statistical Knowledge Sources in Natural-Language Processing for ATIS. ARPA Spoken Language Technology Workshop. 1995. 4 pages.
Nasr et al., A Language Model Combining N-Grams and Stochastic Finite State Automata. Proceedings of Eurospeech. 1999:2175-78.
Ney et al., Dynamic programming search for continuous speech recognition. IEEE Signal Processing Magazine. 1999;16(5):64-83.
Novak et al., Two-pass search strategy for large list recognition on embedded speech recognition platforms. 2003 IEEE International Conference on Acoustics, Speech, and Signal Processing. 2003 Proceedings. (ICASSP '03). Apr. 2003;1:I-200-I-203.
Pereira et al., Speech Recognition by Composition of Weighted Finite Automata. Finite-State Language Processssing. MIT Press. 1996:431-53.
Samuelsson et al., A class-based language model for large-vocabulary speech regonition extracted from part-of-speech statistics. IEEE ICASSP-99. IEEE. 1999:537-40.
Schalkwyk et al., Speech Recognition with Dynamic Grammars Using Finite-State Transducers. Eurospeech. 2003:1969-72.
Su, Bayesian Class-Based Language Models. 2011 IEEE International Conference on Acoustics, Speech and Signal Processing (ICASSP). 2011:5564-67.
Wang et al., A Unified Context-Free Grammar and N-Gram Model for Spoken Language Processing. 2000 IEEE International Conference on Acoustics, Speech, and Signal Processing. vol. 3. 2000;3:1639-42.
Ward et al., Flexible use of semantic constraints in speech recognition. ICASSP'93 Proceedings of the 1993 IEEE international conference on Acoustics, speech, and signal processing: speech processing—vol. II. 1993:49-50.
Whittaker et al., Efficient class-based language modelling for very large vocabularies. 2001 IEEE international Conference on Acous-

(56) References Cited

OTHER PUBLICATIONS tics Speech and Signal Processing (ICASSP'01). Salt Lake City, Utah . May 7-11, 2001;1:545-548.

Young et al., Token Passing: a Simple Conceptual Model for Connected Speech Recognition Systems. Technical Report. 1989. 23 pages.

Yu et al., N-Gram Based Filler Model for Robust Grammar Authoring. 2006 IEEE International Conference on Acoustics, Speech and Signal Processing. ICASSP 2006 Proceedings. 2006;1:I-565-I-568.

* cited by examiner

MULTIPLE PASS AUTOMATIC SPEECH RECOGNITION METHODS AND APPARATUS

CROSS-REFERENCE TO RELATED APPLICATIONS

The present application is a national stage application under 35 U.S.C. § 371 of International Application No. PCT/US2013/056403, filed on Aug. 23, 2013, entitled "MULTIPLE PASS AUTOMATIC SPEECH RECOGNITION METHODS AND APPARATUS," which is hereby incorporated by reference in its entirety.

BACKGROUND

Conventional large vocabulary automatic speech recognition (ASR) systems may be well suited for recognizing natural language speech. For example, ASR systems that utilize statistical language models trained on a large corpus of natural language speech may be well suited to accurately recognize a wide range of speech of a general nature and may therefore be suitable for use with general-purpose recognizers. However, such general-purpose ASR systems may not be well suited to recognize speech containing domain-specific content. Specifically, domain-specific content that includes words corresponding to a domain-specific vocabulary such as jargon, technical language, addresses, points of interest, proper names (e.g., a person's contact list), media titles (e.g., a database of song titles and artists, movies, television shows), etc., presents difficulties for general-purpose ASR systems that are trained to recognize natural language.

Domain-specific vocabularies frequently include words that do not appear in the vocabulary of general-purpose ASR systems, include words or phrases that are underrepresented and/or that do not appear in the training data on which such general-purpose ASR systems were trained and/or are large relative to a natural language vocabulary. As a result, general-purpose ASR systems trained to recognize natural language may perform unsatisfactorily when recognizing domain-specific content that includes words from one or more domain-specific vocabularies.

Special-purpose ASR systems are often developed to recognize domain-specific content. As one example, a speech-enabled navigation device may utilize an automatic speech recognizer specifically adapted to recognize geographic addresses and/or points of interest. As another example, a special-purpose ASR system may utilize grammars created to recognize speech from a domain-specific vocabulary and/or may be otherwise adapted to recognize speech from the domain-specific vocabulary. However, special-purpose ASR systems may be unsuitable for recognizing natural language speech and, therefore, their applicability may be relatively limited in scope.

Automatically recognizing mixed-content speech that includes both natural language and domain-specific content, therefore, presents significant challenges to conventional ASR systems. As an illustration, the spoken utterance "Please provide me with directions to 16 Quinobequin Road in Newton, Mass.," which includes a natural language portion "Please provide me with directions to" and "in" and a domain-specific portion "16 Quinobequin Road" and "Newton, Mass.," may not be accurately recognized using conventional ASR techniques. In particular, a general-purpose ASR system (e.g., a large vocabulary recognizer trained to recognize natural language) may have difficulty recognizing words in the domain-specific portion. Similarly, a special-purpose ASR system (e.g., a recognizer adapted to recognize particular domain-specific content) may be unable to accurately recognize the natural language portion.

Attempts at using multiple recognizers, each independently recognizing the input speech, and then combining the recognition results in a post-processing step generally produce unsatisfactory results not only because the recognition of speech content for which a particular recognizer is not well suited may be generally poor, but also because the presence of such speech content will typically degrade the recognition performance on speech content for which a particular recognizer is adapted (e.g., the presence of domain-specific content will generally degrade the performance of a general-purpose ASR system in recognizing natural language and the presence of natural language will generally degrade the performance of a special purpose ASR system in recognizing associated domain-specific content). Moreover, it may be difficult to correctly determine which portions of recognition results from the multiple recognizers should be selected to produce the final recognition result.

SUMMARY

Some embodiments are directed to a method of recognizing speech that comprises natural language and at least one word specified in at least one domain-specific vocabulary, the method comprising performing a first speech processing pass comprising identifying, in the speech, a first portion including the natural language and a second portion including the at least one word specified in the at least one domain-specific vocabulary, and recognizing the first portion including the natural language. The method further comprises performing a second speech processing pass comprising recognizing the second portion including the at least one word specified in the at least one domain-specific vocabulary.

Some embodiments are directed to at least one computer readable medium storing instructions that, when executed by at least one processor, cause at least one computer to perform a method of recognizing speech that comprises natural language and at least one word specified in at least one domain-specific vocabulary, the method comprising performing a first speech processing pass comprising identifying, in the speech, a first portion including the natural language and a second portion including the at least one word specified in the at least one domain-specific vocabulary, and recognizing the first portion including the natural language. The method further comprises performing a second speech processing pass comprising recognizing the second portion including the at least one word specified in the at least one domain-specific vocabulary.

Some embodiments are directed to a system comprising at least one computer for recognizing speech that comprises natural language and at least one word specified in at least one domain-specific vocabulary, the system comprising at least one computer readable medium storing instructions and at least one processor programmed by executing the instructions to perform a first speech processing pass comprising identifying, in the speech, a first portion including the natural language and a second portion including the at least one word specified in the at least one domain-specific vocabulary, and recognizing the first portion including the natural language. The at least one processor is further programmed to perform a second speech processing pass comprising recognizing the second portion including the at least one word specified in the at least one domain-specific vocabulary.

According to some embodiments, performing the first speech processing pass comprises using at least one language model to recognize the first portion including the natural language, and using at least one filler model to assist in identifying the second portion including the at least one word specified in the at least one domain-specific vocabulary. According to some embodiments, performing the first speech processing pass results in at least one recognized word from the first portion including the natural language and at least one tag identifying the second portion. According to some embodiments, performing the first speech processing pass does not include recognizing words in the second portion.

According to some embodiments, the at least one language model includes at least one statistical language model representing probabilities of transitioning from one or more words to one or more classes corresponding to the at least one domain-specific vocabulary and/or representing probabilities of transitioning from the one or more classes to the one or more words.

According to some embodiments, the at least one filler model is associated with the at least one domain-specific vocabulary. According to some embodiments, the at least one filler model includes a first filler model and the at least one domain-specific vocabulary comprises a first domain-specific vocabulary, and wherein the first filler model is trained, at least in part, on data in the first domain-specific vocabulary. According to some embodiments, the at least one filler model includes at least one phoneme model, which may include, for example, a phoneme loop model and/or an N-gram model.

According to some embodiments, performing the first speech processing pass includes using the at least one filler model to determine phoneme likelihoods in the second portion, and wherein performing the second speech processing pass includes using the phoneme likelihoods from the first speech processing pass to facilitate recognizing the second portion.

According to some embodiments, performing the second speech processing pass comprises recognizing the portion having words specified in the at least one domain-specific vocabulary using at least one grammar associated with the at least one domain-specific vocabulary.

According to some embodiments, the first speech processing pass and/or the second speech processing pass is implemented, at least in part, using at least one finite state transducer and, according to some embodiments, the at least one statistical model and the at least one filler model are utilized by a weighted finite state transducer.

According to some embodiments, the first speech processing pass is performed at a first location on a network and the second speech processing pass is performed at a second location on the network, wherein the first location is different from the second location. According to some embodiments, the first speech processing pass is performed on at least one server on the network configured to perform natural language speech recognition. According to some embodiments, the second speech processing pass is performed on a mobile device. According to some embodiments, the second speech processing pass is performed on a domain-specific device associated with the at least one domain-specific vocabulary. According to some embodiments, the first speech processing pass is performed on a mobile device and the second speech processing pass is performed on a domain-specific device associated with the at least one domain-specific vocabulary.

According to some embodiments, the second portion including the at least one word specified in the at least one domain-specific vocabulary includes a third portion including at least one word specified in a first domain-specific vocabulary and a fourth portion including at least one word specified in a second domain-specific vocabulary, and wherein performing the second speech processing pass comprises using a first domain-specific speech recognizer adapted to recognize words in the first domain-specific vocabulary to recognize the third portion, and using a second domain-specific recognizer adapted to recognize words in the second domain-specific vocabulary to recognize the fourth portion. According to some embodiments, the at least one filler model includes a first filler model trained at least in part on data in the first domain-specific vocabulary, and a second filler model trained at least in part on data in the second domain-specific vocabulary. According to some embodiments, the first domain-specific recognizer is implemented by using at least one processor located at a first location on a network and the second domain-specific recognizer implemented by using at least one processor located at a second location on the network, wherein the first location is different from the second location.

BRIEF DESCRIPTION OF DRAWINGS

Various aspects and embodiments will be described with reference to the following figures. It should be appreciated that the figures are not necessarily drawn to scale.

DETAILED DESCRIPTION

Figure 1:
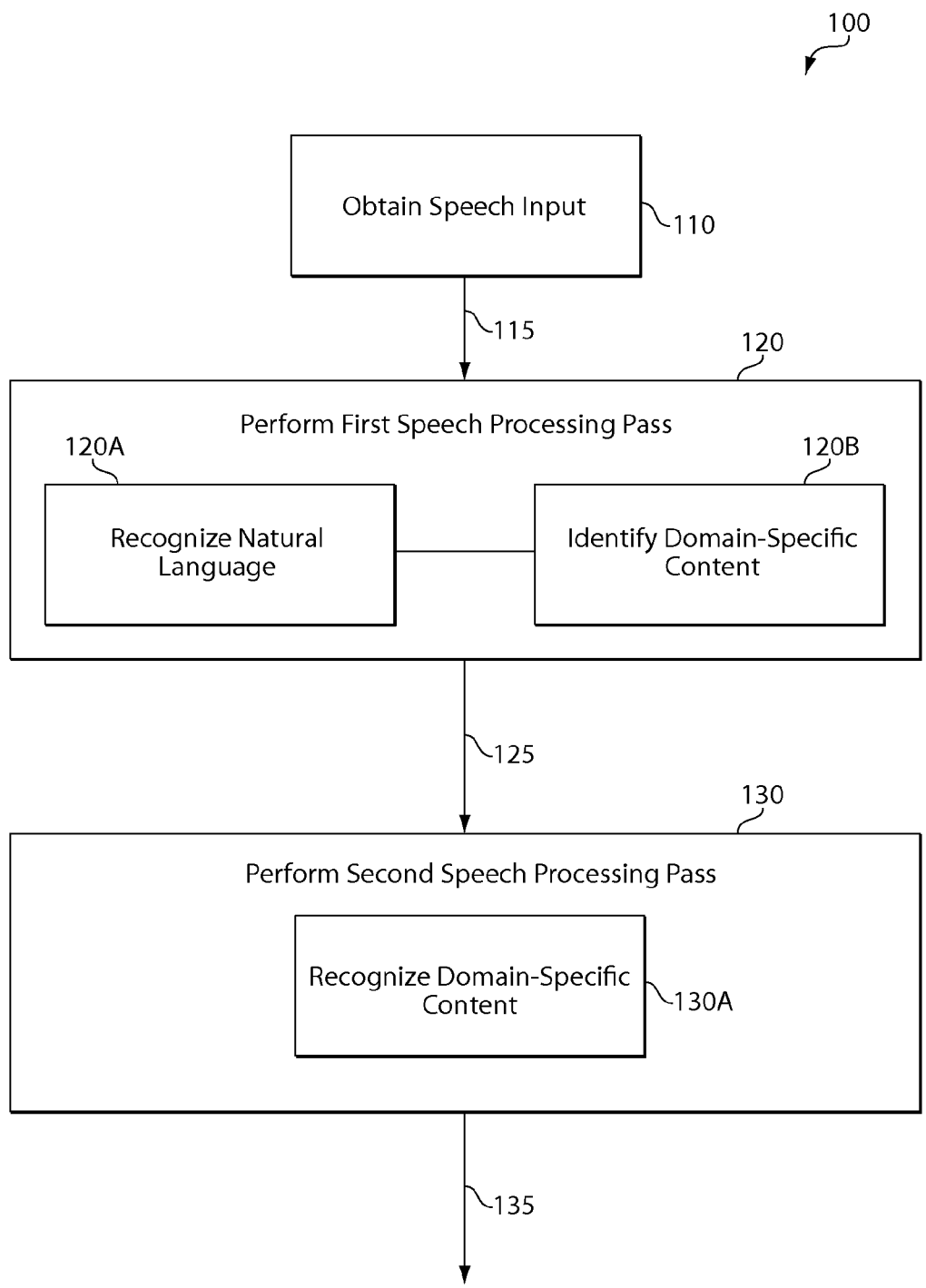
FIG. 1 is a flowchart of an illustrative process for recognizing mixed-content speech including natural language and domain-specific content, in accordance with some embodiments.

As discussed above, conventional ASR systems may perform unsatisfactorily when recognizing speech that includes both natural language and domain-specific content. Typically, general-purpose speech recognizers are trained on a large corpus of training data that captures a wide variety of natural language. As such, language models trained in this fashion capture and represent the statistics (e.g., word frequencies, word sequence probabilities, etc.) of language as generally employed in common usage and therefore may operate suitably for general-purpose automatic speech recognition.

Domain-specific vocabularies may include words that are not part of the vocabulary of a particular general-purpose ASR system (e.g., because words in a given domain-specific vocabulary are uncommon and/or peculiar to the domain, too numerous to be captured by a natural language vocabulary, etc.), or may include words that are not well represented in the training data. For example, domain-specific vocabularies may include jargon, technical terms, proper nouns, user specific data and/or other words or phrases that were either not well represented in the training data of a general-purpose ASR system, or not represented at all. Some domain-specific vocabularies may include large numbers of words or phrases relative to a natural language vocabulary. For example, there are on the order of fifty million addresses in the United States with approximately two and a half million distinct words. As such, the magnitude of an address vocabulary that captures such addresses may be significantly larger than that of a natural language vocabulary. Some domain-specific vocabularies may not be particularly large, but may include words and/or phrases that are relatively atypical with respect to common or natural language, as discussed in further detail below.

Word, term and/or phrase usage in domain-specific vocabularies may depart from the statistics of natural language, such that using models representing natural language statistics may lead to unsatisfactory performance when recognizing domain-specific content that deviates from the modeled usage statistics. As such, domain-specific vocabularies may not only include words that are out of the vocabulary of a general-purpose ASR system, but certain in-vocabulary words and phrases may be under represented in the training data on which the general-purpose ASR system was trained. Additionally, disparate usage statistics between domain-specific vocabularies and those represented by natural language models may cause additional difficulties for general-purpose ASR systems in recognizing domain-specific content.

As one example, a domain-specific vocabulary may include geographic addresses, which frequently contain street names, town/city names, country names, or other geographic names (e.g., places of interest, etc.) that are not generally common usage words and therefore may not be part of the vocabulary of a general-purpose ASR system or may not be well represented in the training data on which the general-purpose ASR system was trained. Another example of a domain-specific vocabulary for which recognition by a general-purpose ASR system may be frequently problematic is a vocabulary of proper names, particularly last names and uncommon names, which are frequently misrecognized by general-purpose ASR systems.

Technical terms (e.g., medical terms, scientific terms, specialized trade vocabularies), jargon, user specific or user dependent data (e.g., data about or for a specific user stored on an electronic device), etc., are other non-limiting examples of domain-specific vocabularies for which recognition may be desired. Generally speaking, any vocabulary representing a collection of words that may be underrepresented or not represented in a general purpose vocabulary and/or in the training data on which a general purpose ASR system was trained may be considered a domain-specific vocabulary for which techniques described herein may be applied.

To address at least some of the difficulties in recognizing speech having both natural language and domain-specific content, herein referred to as mixed-content speech, the inventors have developed multi-pass speech recognition techniques to facilitate improved recognition of such mixed-content speech. According to some embodiments, a first speech-processing pass is performed on mixed-content speech that contains both natural language content and domain-specific content to recognize the natural language content and to identify one or more portions having domain-specific content. Subsequently, a second speech-processing pass is performed to recognize portions of the speech identified during the first speech-processing pass as containing domain-specific content. The domain-specific content may include one or more words specified in one or more domain-specific vocabularies, for example, a domain-specific database storing media titles, addresses, personal contacts, technical terms, and/or any other domain-specific vocabulary or vocabularies for which recognition may be desirable.

In some embodiments, at least one filler model associated with the domain-specific content is employed in the first speech processing pass to assist in identifying the portions of the speech having domain-specific content. A filler model refers generally to any model adapted to identify associated domain-specific content without necessarily recognizing words in the domain-specific portion (i.e., without requiring that the words in the identified portions be recognized). For example, a filler model associated with domain-specific content comprising addresses may be used to identify what portion (if any) of a speech utterance contains an address without necessarily recognizing the words that constitute the street address.

A filler model may be used to assist in identifying speech portions having domain-specific content in any of numerous ways. In some embodiments, a filler model may be adapted to domain-specific content (e.g., by being trained on training data including at least some domain-specific content) such that the filler model is capable of indicating the likelihood that a portion of speech contains domain-specific content based on a measure of similarity between the speech portion and the domain-specific content to which the filler model was adapted. In this respect, a filler model may include one or more models (e.g., one or more acoustic models of any suitable type, one or more phoneme models of any suitable type, one or more morpheme models of any suitable type, one or more pronunciation models of any suitable type, etc.) adapted to corresponding domain-specific content (e.g., by being trained using training data comprising corresponding domain-specific content).

Filler models in this respect may be used to calculate a likelihood that a portion of speech contains domain-specific content based on acoustic similarity, phonetic similarity and/or morphemic similarity, etc. between the portion of speech and content in a corresponding domain specific vocabulary as represented by the associated filler model. According to some embodiments, a filler model associated with domain-specific content may comprise an acoustic model (e.g., an acoustic model implemented using Gaussian mixture models, an acoustic model implemented using a neural network, etc.) a phoneme model (e.g., a model trained or built from tokenized sequences of phones or sub-phones such as a phoneme loop model, an N-gram model such as a bigram or a trigram model, etc.) and/or one or more additional models, with such models being trained on speech data of the corresponding domain specific content. In general, a filler model represents acoustic, phonemic and/or morphemic characteristics of the domain-specific content, but typically does not model word usage statistics (e.g., word frequencies, probabilities of one or more words following one or more other words, etc.) as would a statistical language model, though some filler models may to some extent do so.

According to some embodiments, a filler model may map features derived from the speech portion to one or more phoneme sequences (word fragments) and, in some instances, their respective likelihoods using, for example, one or more models described above. In this way, a filler model may identify portions in a speech input containing domain-specific content by identifying strong matches between the acoustic, phonemic, morphemic, etc. make-up of portions of the speech input and that represented by the filler model trained on corresponding domain-specific content. However, portions of speech containing domain-specific content may be identified using other techniques (e.g., using one or more statistical classifiers trained to identify portions of speech containing domain-specific content), as the manner in which domain-specific content is identified is not limited to any particular technique or set of techniques.

As discussed above, statistical language models represent language statistics including the probability that one or more words follow or precede a given word sequence of one or more words, referred to herein as word transition probabilities. For example, a language model may be trained on a large corpus of natural language training data such that the language model represents the statistics of natural, general, and/or conversational speech. The language model may include, but is not limited to, a representation of word frequency of words in the natural language vocabulary and/or the probabilities of words following other words and/or word sequences (e.g., via an N-gram language model). Specifically, the language model may represent the probability of words or word sequences following and/or preceding other words or word sequences so that high probability word sequences can be located and selected as recognition candidates (e.g., in an n-best list). Language models of this general type are frequently utilized by natural language speech recognizers.

The inventors have appreciated that statistical language models of the type described above may be insufficient when recognizing speech having both natural language and domain-specific content at least because these language models may not accurately model the statistics and/or represent the vocabulary of the domain-specific content. The inventors have recognized that utilizing tagged language models (also referred to as class language models) may facilitate more accurate recognition of mixed-content speech.

Accordingly, some embodiments relate to using at least one statistical language model representing the likelihood that a class (or classes) follows or precedes a given word or word sequence to assist in recognizing natural language content and identifying portions of speech containing domain-specific content associated with the class or classes for which transition probabilities are represented. A statistical language model that represents class transition probabilities is referred to herein as a tagged language model.

The term class is used herein to refer to any group of words/phrases having one or more shared characteristics including belonging to a particular category, a particular domain and/or by belonging to a same specific vocabulary in which the words/phrases are associated together. Generally speaking, a class whose transition probabilities are modeled by a tagged language model corresponds to a domain-specific vocabulary of interest for which identification and ultimately recognition is desired. In this respect, the tagged language model may represent class transition probabilities to assist in identifying portions of domain-specific content and "tagging" those portions as belonging to the corresponding class (e.g., by indicating or identifying a domain specific vocabulary containing the domain-specific content).

As one non-limiting example, a tagged language model that represents the likelihood that an address precedes or follows a given word or sequence of words may be used to assist in identifying portions of speech containing an address that is part of an address vocabulary such as a database of addresses and/or points of interest. As another non-limiting example, a tagged language model that represents transition probabilities for proper names may be used to assist in identifying portions of speech containing names that are part of a name vocabulary of interest (e.g., a user's contact list, a business directory, etc.).

By modeling the probabilities that one or more of a particular class of words (e.g., address words) will precede and/or follow a given word or word sequence (e.g., the probability that a street address will follow the word sequence "I live at"), a tagged language model can provide a likelihood that a portion of speech contains content associated with the particular class. While tagged language models may be utilized to assist in recognizing natural language and identifying domain-specific content in some embodiments, use of tagged language models is not required, as other techniques may be utilized to recognize natural language content and identifying portions of speech containing domain specific content.

According to some embodiments, utilizing at least one tagged language model in conjunction with one or more filler models facilitates simultaneously recognizing, in a first speech processing pass of mixed-content speech, natural language portions of mixed-content speech and identifying portions having domain-specific content. In this respect, portions of speech that a tagged language model and a filler model both indicate likely contain domain-specific content can be treated as such in a second speech processing pass in which the identified domain-specific portions are recognized at least in part by using one or more domain-specific recognizers.

The inventors have appreciated that attempting to recognize natural language content and domain-specific content in a single speech processing pass using a natural language recognizer and a domain-specific recognizer may not perform satisfactorily due at least in part to one or more adverse effects associated with the computational complexity that may result from the use of two recognizers together. By deferring recognition of the domain-specific content to a second speech processing pass, one or more of the adverse effects may be avoided and improved recognition results may be obtained. Additionally, such a multi-pass approach allows a natural language recognizer and a domain-specific recognizer to focus on recognizing speech for which they were adapted, allows recognition parameters to be optimally tuned for each speech processing pass and permits different decoding schemes to be used for each speech processing pass if desired (e.g., a Viterbi beam search for the first speech processing pass and a conditional random field (CRF) classifier for the second speech processing pass).

According to some embodiments, information obtained in performing a first speech processing pass may be utilized in performing a second speech processing pass. For example, acoustic, phonemic and/or morphemic information obtained for the identified portion containing domain-specific content during the first speech processing pass may be utilized to facilitate recognizing the domain-specific portion in the second speech processing pass. Such information may reduce the complexity of recognizing the domain-specific content. In this respect, information obtained using one or more filler models to assist in identifying domain-specific content in a first speech processing pass may be used to reduce the number of candidate words in a corresponding domain-specific vocabulary that are considered when recognizing the domain-specific content in a second speech processing pass (e.g., by eliminating words in the domain-specific vocabulary that are not a match for the acoustic, phonemic and/or morphemic content evaluated in the first speech processing pass). This may be particularly advantageous for relatively large domain-specific vocabularies.

The inventors have also appreciated that multi-pass techniques described herein may facilitate distributed recognition schemes wherein a first speech processing pass is performed at a first location and a second speech processing pass is performed at a second location, which locations may be local or remote from one another and may be connected via one or more networks and/or coupled using device-to-device protocols.

As one non-limiting example, the first speech processing pass may be performed by at least one server on a network having a large vocabulary natural language recognizer, and the second pass may be performed on a device (e.g., a smart phone) connected to the network and having a recognizer adapted to recognize domain-specific content. As another non-limiting example, the first speech processing pass may be performed by one or more generally higher performance computer hardware processor(s) than the computer hardware processor(s) used to perform the second speech processing pass. The processors performing the first and second speech processing passes may be part of a single device or may be in different devices and may be local or remote (e.g., distributed over a network such as a wide area network, for example, the Internet).

According to some embodiments, domain-specific recognizers implemented on domain-specific devices (e.g., a recognizer adapted to recognize addresses and/or points of interest for a speech-enabled navigation device) may be utilized in a second speech processing pass to recognize speech portions containing domain-specific content identified in a first speech processing pass, which in turn may have been performed on the domain-specific device, or performed on another device located remotely over a network (e.g., one or more servers accessible over a wide area network (WAN), a mobile device accessible over a cellular or other wireless network), locally via a network (e.g., a mobile device communicating via a cellular or wireless network) or using device-to-device communication (e.g., Bluetooth® or the like). As such, resources available on a network (e.g., in the cloud) may be utilized to perform mixed-content recognition using a multi-pass approach in any number of configurations that may suit a wide variety of applications.

Following below are more detailed descriptions of various concepts related to, and embodiments of, methods and apparatus for recognizing mixed-content speech using multi-pass speech processing techniques. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 shows an illustrative process 100 for recognizing mixed-content speech having natural language and domain-specific content, in accordance with some embodiments. As described above, process 100 may be implemented using one device or multiple devices in a distributed manner. For example, process 100 may be implemented using any of the system configurations described in connection with the illustrative environment 400 described with reference to FIG. 4 below or using other configurations, as the multi-pass techniques are not limited for use with any particular system or system configuration, or with any particular environment.

Process 100 begins by performing act 110, where speech input 115 containing natural language and domain-specific content is obtained. In some embodiments, speech input may be received via a device to which a user provides speech input by speaking to the device. For example, speech input may be received from the user's mobile phone, a smart phone, a speech-enabled navigation unit, the user's computer (e.g., a desktop computer, a laptop computer, a tablet computer, etc.), and/or any other device configured to receive speech input from the user. Alternatively, speech input 115 may be obtained by retrieving it from a storage location where the speech input was previously stored, as techniques described herein are not limited to any particular method of obtaining speech input 115.

In some embodiments, speech input 115 may comprise one or more speech signals (e.g., one or more digitized speech waveforms). Additionally or alternatively, speech input 115 may comprise features derived from speech waveforms. For example, speech input 115 may comprise speech features (e.g. Mel-frequency cepstral coefficients, perceptual linear prediction coefficients, etc.) computed for one or more portions (e.g., frames) of one or more speech waveforms.

After speech input 115 is obtained, process 100 proceeds to act 120, where a first speech processing pass is performed on the speech input 115. The first speech processing pass comprises recognizing portions of the speech input 115 comprising natural language speech (act 120A) and identifying portions of speech input 115 corresponding to domain-specific content (act 120B). Identifying portions of speech input 115 may include identifying portions of the speech input that contain one or more words specified in at least one domain-specific vocabulary without necessarily recognizing the one or more words specified in the at least one domain-specific vocabulary, as discussed in further detail below.

According to some embodiments, acts 120A and 120B are performed generally simultaneously and in cooperation with each other, as discussed in further detail below. In this respect, according to some implementations, performance of one act may facilitate and/or assist in the performance of the other. For example, recognizing natural language content (act 120A) may facilitate and/or assist in identifying domain-specific content (act 120B) and/or vice versa. However, it should be appreciated that acts 120A and 120B may be performed separately, either serially or in parallel, as the manner in which recognizing natural language content and identifying domain-specific content is performed is not limited in this respect.

As one illustrative example of performing first speech processing pass 120, speech input corresponding to the mixed-content spoken utterance "Please play Iko Iko by The Dixie Cups" may be processed in the first speech processing pass to recognize the words "Please play" and "by" and to identify the remaining portions (e.g., the portions corresponding to the song title and artist) as containing domain-specific content comprising one or more words in a domain-specific vocabulary for media titles, without necessarily recognizing the words "Iko Iko" and/or "The Dixie Cups." As another illustrative example, speech input corresponding to the mixed content spoken utterance "This is a short message for Hanna" may be processed in the first speech processing pass to recognize the words "This is a short message for" and to identify the remaining portion of the speech utterance as corresponding to domain-specific content comprising one or more words in a domain-specific vocabulary for proper names, without necessarily recognizing the name "Hanna."

As yet another example, speech input corresponding to the mixed content spoken utterance "Patient Anthony DeSilva has Amyotrophic Lateral Sclerosis and is exhibiting muscle weakness" may be processed in the first speech processing pass to recognize natural language portions: "Patient," "has," and "and is exhibiting muscle weakness," and to identify the portion of the speech input between "Patient" and "has" as corresponding to domain-specific content comprising one or more words in a domain-specific vocabulary for names, and to identify the portion of the speech input between "has" and "and is exhibiting muscle weakness" as corresponding to domain-specific content comprising one or more words in a domain-specific vocabulary for medical terms. As illustrated by the last example, mixed-content speech is not limited to including domain-specific content from a single domain-specific vocabulary and, in some instances, may comprise domain-specific content from multiple domain-specific vocabularies.

In some embodiments, act 120 may be performed at least in part by using at least one tagged language model to process speech input 115 to assist in recognizing natural language content and/or in identifying one or more portions containing domain-specific content. An ASR system, in accordance with some embodiments, may include at least one tagged language model for each type of domain-specific content for which the ASR system is adapted to recognize.

As discussed above, a tagged language model may be a language model that represents the probabilities of word sequences and the probabilities of word/class sequences. That is, a tagged language model may represent the probabilities that a particular class of words corresponding to domain-specific content (e.g., a class of words in a domain-specific vocabulary) will follow and/or precede a given word or sequence of words. For example, a tagged language model may represent the probabilities of transitioning to/from the class of words in a domain-specific vocabulary.

As one example, a tagged language model adapted for addresses may represent the probability that the word sequence "directions to" will be followed by an address, without necessarily representing the probability that any particular address will follow that word sequence. As such, the tagged language model may capture information relating to the likelihood that an address is present without needing to represent statistics on all of the individual addresses of interest. As another example, a tagged language model adapted to identify portions of speech likely containing one or more words in a domain-specific vocabulary of song titles may represent the probability that the word sequence "play for me" will be followed by a song title, without necessarily representing the probability that any particular song title will follow that word sequence. As yet another example, a tagged language model adapted to identify portions of speech likely containing one or more words in a domain-specific vocabulary of names (e.g., names in a user's contact list) may represent the probability that the word "call" will be followed by a name, without necessarily representing the probability that any particular name will follow that word. It should be appreciated that a tagged language model may be adapted to represent probabilities of transitioning to/from any desired class/tag associated with any domain-specific vocabulary for which recognition may be desired.

It should be appreciated that other techniques may be used in the first speech processing pass in place of or in conjunction with at least one tagged language model to assist in recognizing natural language content and/or identifying portions having domain-specific content. For example, in some embodiments, act 120 may be performed at least in part by using at least one filler model to process speech input 115 to assist in recognizing natural language content and/or identifying one or more portions containing domain-specific content, either alone or in combination with at least one tagged language model.

According to some embodiments, at least one filler model is used to assist in identifying portions of speech input 115 containing domain-specific content. As discussed above, a filler model is a model adapted to assist in identifying portions of speech containing corresponding domain-specific content without necessarily recognizing the words. To this end, a filler model may include one or more models (e.g., one or more acoustic models of any suitable type, one or more phoneme models of any suitable type, one or more morpheme models of any suitable type, one or more pronunciation models of any suitable type, etc.) adapted to corresponding domain-specific content (e.g., by being trained using training data comprising domain-specific content). Such a filler model may be used to calculate the likelihood that a portion of speech contains corresponding domain-specific content, for example, based on acoustic similarity, phonetic similarity, and/or morphemic similarity between portions of speech signal 115 and content in a corresponding domain-specific vocabulary.

As such, filler models according to some embodiments operate at the acoustic, phonemic, and/or morphemic level. As discussed above, the inventors have appreciated that recognizing both natural language content and domain-specific content in mixed-content speech in a single processing pass requires searching a very large search space of hypotheses that tends to degrade performance due at least in part to having to address the computational complexity of searching this very large search space of hypotheses, and that by recognizing the natural language portion(s) and identifying, but not recognizing, the portion(s) of mixed-content speech corresponding to domain-specific content the search space may be meaningfully reduced in size to improve the performance of mixed-content recognition. Thus, a filler model may be used to identify portions that have acoustic, phonemic and/or morphemic similarity to words in one or more domain-specific vocabularies, but to recognize the domain-specific content, in accordance with some embodiments. As previously described, filler models generally do not include language statistics (e.g., word frequencies, word-word transition probabilities, etc.) for the words in the domain-specific vocabulary.

Thus, according to some embodiments, performing the first speech processing pass at act 120 may comprise using one or more tagged language models and one or more filler models corresponding to domain-specific content to identify the portions containing the domain-specific content. As discussed, a tagged language model may be adapted to represent probabilities that a given word and/or sequence of words (e.g., natural language word candidates recognized in speech input 115) is/are succeeded or preceded by a corresponding class of words (e.g., by one or more words in a domain-specific vocabulary associated with the class). As further discussed above, a filler model adapted to domain-specific content may be utilized to assist in identifying portions of speech that exhibit acoustic, phonemic and/or morphemic features characteristic of words in the domain-specific vocabulary to which the filler model is adapted. As such, a portion of a speech signal that a corresponding tagged language model indicates is likely to correspond to domain-specific content (e.g., a portion that the tagged language model indicates is likely to be of the class characterized by a corresponding domain-specific vocabulary), and that an associated filler model assesses as a good acoustic, phonemic and/or morphemic match may be identified as a portion containing domain-specific content.

Accordingly, some embodiments include performing acts 120A and 120B at least in part by using at least one tagged language model and at least one filler model to process speech input 115 to recognize natural language content and identify one or more portions containing domain-specific content. An ASR system, in accordance with some embodiments, may utilize the at least one tagged language model and the at least one filler model (and, in some implementations, one or more other models such as one or more acoustic models, one or more phoneme models, one or more pronunciation models, one or more grammars, one or more dictionaries, etc.) to recognize the natural language portion of mixed-content speech and to identify portion(s) having domain-specific content for which the at least one tagged language model and/or the at least one filler model have been adapted, which may be achieved using any suitable technique or techniques.

For example, in some embodiments, an ASR system may perform acts 120A and 120B by using the above-described models to evaluate the likelihoods of various hypotheses, each hypothesis including potential recognition results for the natural language portion(s) of speech input 115 and information identifying portions of the speech input having domain-specific content, and identifying or selecting one or more such hypotheses (e.g., the most likely hypothesis, the N-best hypotheses, etc.). The evaluation of hypotheses may be performed by using dynamic programming (e.g., a Viterbi beam search, a token-passing time-synchronous Viterbi beam search, etc.) and/or one or more other techniques (e.g., histogram pruning). Evaluating the likelihoods of various hypotheses and identifying one or more most likely hypothesis is generally referred to as decoding.

In some embodiments, an ASR system may employ a common representation for the at least one tagged language model and the least one filler model (and, in some implementations, one or more other models described above) and utilize this common representation to evaluate likelihoods of the above-described hypotheses. As one non-limiting example, a finite automata representation (e.g., a weighted finite state transducer) may be employed as a common representation of information in the at least one tagged language model and the at least one filler model. In turn, the weighted finite state transducer may be used to evaluate the likelihoods of various hypotheses, each hypothesis including potential recognition results for the natural language portion (s) of speech input 115 and information identifying portions of the speech input having domain-specific content.

A weighted finite state transducer representing the at least one tagged language model, the at least one filler model, and (optionally) one or more other models may be constructed in any suitable way. In some embodiments, the at least one tagged model and any other model(s) employed by the ASR system, with the exception of the at least one filler model, may each be represented as a weighted automaton and these automata may be composed (e.g., by using composition, minimization, and determinization operations as known in the art) to construct a transducer representing a search network. The search network may include one or more output states each corresponding to a tag in the at least one tagged language model, where each tag corresponds to a class of words in a domain-specific vocabulary (e.g., addresses, proper names, medical terms, media titles, etc.). In some embodiments, during decoding of the search network, when a tag (e.g., <address>, <name>, <medical term>, <media title>, etc.) is reached, the search network may be expanded by nesting a weighted finite state transducer representing the filler model corresponding to the tag (e.g., the filler model adapted to identify portions of speech containing addresses, proper names, medical terms, media titles, etc.). To this end, the search network may be topologically sorted.

An example of embedding a filler model into a search network is described below using conventional finite state automata notation. In particular, to embed into the search network a transducer G' representing a filler model corresponding to a tag, source and destination states of transitions in the search network having the tag as an output label may be marked. Those transitions may have a δ input label to prevent being eliminated during determinization and minimization. The transducer G' is embedded using an ε transition, if a marked state is reached during decoding. If a final state in G' is reached, an ε transition is taken back to the search network. Indeterminism introduced by the above-described technique may be addressed, at least in part, by increasing the width of the beam employed in decoding (i.e., the number of hypotheses being evaluated during decoding). Other nesting methods may also be employed, as implementing such techniques are not limited to any particular manner of doing so.

It should also be appreciated that the first speech processing pass of act 120 is not limited to being implemented using finite state automata and may be implemented in any other suitable way, as techniques for implementing the first speech processing pass are not limited in this respect. It should be further appreciated that techniques other than tagged language models and/or filler models may be used to utilize the inventors' insight that recognition of mixed-content speech may be facilitated by performing a first speech processing pass to recognize natural language content and identify one or more portions containing domain-specific content, which may be subsequently recognized in a second speech processing pass, as the aspects are not limited to any particular technique or set of techniques for doing so.

Performing the first speech processing pass (act 120) may result in first pass results 125 comprising natural language recognition results and information identifying one or more portions of speech input 115 containing domain-specific content (e.g., one or more tags). In some embodiments, first pass results 125 may identify a portion of speech input 115 as corresponding to domain-specific content by using a tag that identifies the class to which the domain-specific content belongs and/or the domain-specific vocabulary that the domain-specific content is part of. As one example, first speech processing results 125 for the spoken utterance "Please give me directions to forty seven Newbury Street," may include:

Please give me directions to <address>,
where the italicized portion is recognized text corresponding to the natural language portion and <address> is a tag indicating that the portion of the speech input following the word "to" is an address. The tag provides an indication that the words in the portion identified by the tag belong to an address vocabulary. As discussed in further detail below, the portion identified by the tag may be recognized, in the second speech processing pass, at least in part by using a recognizer adapted for the tagged domain-specific content (e.g., a recognizer adapted to recognize addresses). As another example, first speech processing results for the spoken utterance "Patient Anthony DeSilva has Amyotrophic Lateral Sclerosis and is exhibiting muscle weakness," may include:

Patient <name> has <medical term> and is exhibiting muscle weakness, where the italicized portion is recognized text corresponding to the natural language portion of the spoken utterance and <name> and <medical term> are tags indicating those portions of the speech input contain words from respective domain-specific vocabularies (i.e., name and medical term vocabularies, respectively).

Figure 2A:
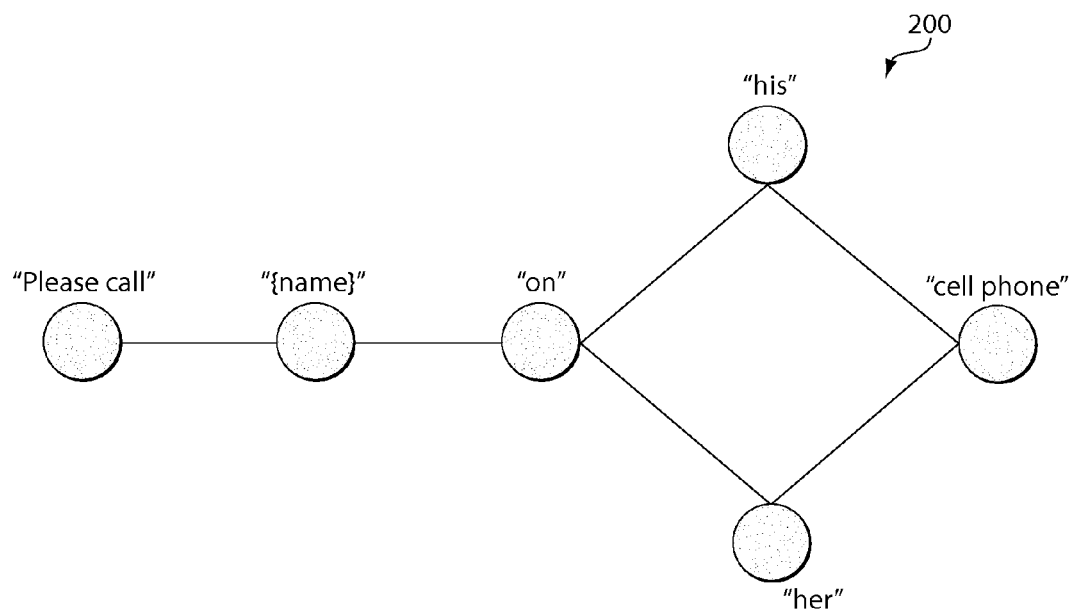
FIG. 2A is a diagram showing an illustrative lattice calculated as part of a first speech processing pass in a multiple-pass process for recognizing mixed-content speech, in accordance with some embodiments.

According to some embodiments, first pass results 125 may identify multiple potential recognitions of the natural language portion of speech input 115. For example, first pass results 125 may include a representation of the N most likely potential recognitions of the natural language content of the speech input 115 obtained during the first speech recognition pass, where N is an integer greater than or equal to one (e.g., N is greater than or equal to 1, 2, 5, 10, 25, 50, 100, etc.). The N most likely potential recognitions may be represented in any suitable way and, for example, may be represented by using an N-best list, a lattice, and/or in any other suitable way. FIG. 2A illustrates a lattice 200 representing two hypotheses: "Please call <name> on his cell phone" and "Please call <name> on her cell phone." However, it should be appreciated that the first pass results 125 need not provide multiple recognition results and instead may include only the highest likelihood hypothesis as to the content of the natural language portion of speech input 115.

According to some embodiments, first pass results 125 may additionally include data related to the contents of any portion identified during the first speech processing pass, at act 120, as having domain-specific content. For example, first pass results 125 may include information obtained at least in part by using one or more filler models utilized during the first speech processing pass. Such information may include any information produced by any constituent models of the filler model(s) (e.g., one or more acoustic models, one or more phone models, one or more morpheme models, one or more pronunciation models, etc.). As one non-limiting example, a filler model may produce one or more phoneme sequences (and, in some instances, their respective likelihoods) corresponding to a portion of the speech input identified during the first speech processing pass as containing domain-specific content to which the filler model is adapted. Such additional information may be provided as part of first pass results 125 to facilitate recognition, in the second speech processing pass, of the domain-specific content identified (e.g., tagged) in the first speech processing pass.

It should be appreciated that any information generated or otherwise determine during the first speech processing pass may be provided for use during a second speech processing pass to facilitate recognition of the domain specific content and/or select a 1-best recognition of the speech input. However, such additional information is not required and first pass results 125 may consist of recognition results for natural language content and identification of one or more portions of speech input 115 containing domain-specific content (e.g., one or more tags), as the information passed from the first speech processing pass to the second speech processing pass is not limited in this respect.

After the first speech processing pass is performed at act 120, a second speech processing pass may be performed at act 130. The second speech processing pass comprises recognizing (act 130A) one or more portions of speech input 115 identified as having domain-specific content during the first speech processing pass. Domain-specific content may be recognized by using any suitable technique or techniques. As one example, performing the second speech processing pass may include utilizing one or more grammars associated with the domain-specific content. As another example, performing the second speech processing pass may include utilizing one or more speech recognizers trained at least in part by using data including the domain-specific content. For example, in some embodiments, mixed-content speech may comprise domain-specific content including content from two or more domain-specific vocabularies and the second pass may be performed at least in part by using a respective speech recognizer for each of the two or more domain-specific vocabularies. However, it should be appreciated that recognition of the domain-specific content may be performed in any other suitable manner, as techniques for recognizing the domain-specific content are not limited in this respect.

The second speech processing pass may be performed at least in part by using the results of the first speech processing pass. In this respect, some embodiments may include evaluating the likelihoods of various hypotheses, each hypothesis including potential recognition results for the natural language portions(s) of speech input 115 (obtained during the first pass at act 120) and potential recognition results for the portions of speech input 115 identified as having domain-specific content. As in the first pass, the evaluation of such hypotheses may be performed by using dynamic programming (e.g., a Viterbi beam search, a token-passing time-synchronous Viterbi beam search, etc.) and/or any other suitable technique.

In some embodiments, the set of hypotheses to evaluate during the second speech processing pass may be identified based on the results of the first speech processing pass. As previously described, first pass results may include one or more tags with each tag identifying a portion of speech input 115 having domain-specific content. In turn, a tag (e.g., <address>, <name>, <medical term>, etc.) may be used to identify a domain-specific vocabulary (e.g., addresses stored on a user's navigation device, the user's contacts at least some of which are stored on the user's smart phone or computer, a data store of medical terms, a list of media titles on a user's audio player or stored on a mobile device in connection with an audio application, etc.) that may be used for recognizing the speech portion identified by the tag in the second speech processing pass. In turn, the one or multiple most likely potential recognitions of the natural language content of the speech input and the domain-specific vocabularies identified by tags in the first speech results may be used to construct a new set of hypotheses to evaluate during the second speech processing pass.

Figure 2B:
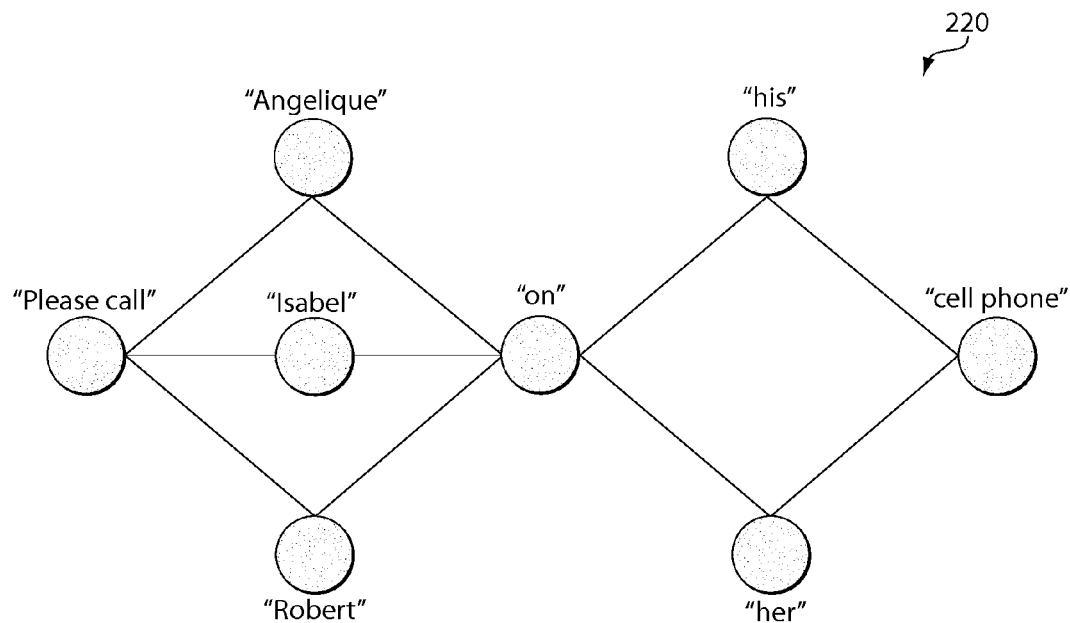
FIG. 2B is a diagram showing how the illustrative lattice of FIG. 2A may be modified during a second speech processing pass in a multiple-pass process for recognizing mixed-content speech, in accordance with some embodiments.

In some embodiments, the new set of hypotheses may be created as a 'cross-product' of the most likely potential recognition(s) of natural language content and the domain-specific vocabulary or vocabularies identified by the tag(s) in the first pass results. That is, the new set of hypotheses includes a hypothesis for every potential recognition of natural language content and every potential recognition for the domain-specific content consistent with the domain-specific vocabulary or vocabularies identified by the tag(s). For example, first pass results shown in FIG. 2A include two potential recognitions (encoded in a lattice) for the natural language portions of the spoken utterance. These potential recognitions are "Please call <name> on his cell phone" and "Please call <name> on her cell phone." In this example, the <name> tag identifies a domain-specific vocabulary of names having three (for ease of depiction) names ("Angelique," "Isabel," and "Robert"). Thus, a new set of six hypotheses may be obtained to evaluate during the second speech processing pass. FIG. 2B shows a lattice representation of this new set of hypotheses.

As previously described, first pass results may include data related to the contents of any portion identified as having domain-specific content. In some embodiments, such additional information may be used to prune the set of hypotheses to evaluate during the second speech processing pass. For example, a filler model may produce one or more phoneme sequences and their respective likelihoods corresponding to a portion of the speech input identified as containing domain-specific content. This additional information may be used to prune out unlikely hypotheses in the second speech processing pass. As a specific example, when the high-likelihood phoneme sequences produced by a filler model adapted to recognizing names all began with a particular phoneme, hypotheses that do not begin with this or a similar phoneme may be pruned from the set of hypotheses evaluated in the second speech processing pass. In this respect, a filler model may be utilized to eliminate candidates from consideration in the second speech processing pass performed to recognize the domain-specific content. As a result, the complexity of the recognition in the second speech processing pass can be significantly reduced to both improve performance and reduce computation time. The benefits in this respect may be particularly significant for large domain-specific vocabularies that may be pruned to a much smaller set of candidate words and/or phrases when performing recognition of the domain-specific content identified in the first speech processing pass.

As with some embodiments of a first speech processing pass, performing the second speech processing pass may include using a finite state automata representation (e.g., a weighted finite state transducer) for the set of hypotheses and evaluating the likelihood of these hypotheses (a second decoding pass) using such a representation. Accordingly, in some embodiments, the one or more most likely recognition hypotheses for the natural language content may be used to create a search network and this search network may be expanded by nesting, for each tag in the search network, a weighted finite state transducer representing the grammar (and/or any other suitable model) associated with the domain-specific vocabulary corresponding to the tag. The weighted finite state transducer representing the grammar may be nested using the same or similar techniques previously described with respect to the filler models in the first speech processing pass.

As may be appreciated from the above discussion, performing the second speech processing pass (act 130) may result in second pass results comprising recognition results for the speech input 115 including recognition results for the natural language and domain-specific portions of speech input 115. That is, second pass results 135 may include the 1-best recognition for speech input 115.

Figure 3:
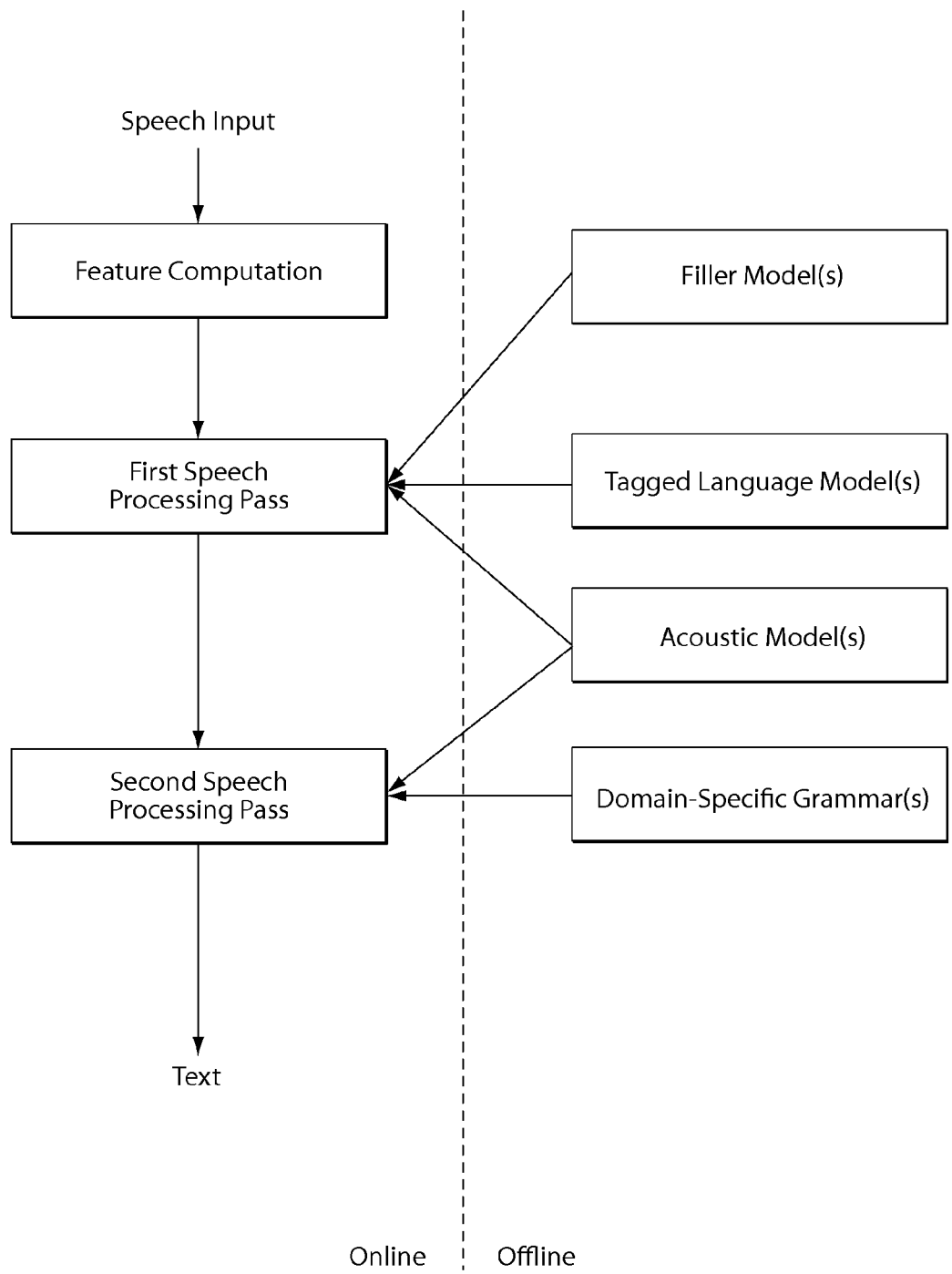
FIG. 3 is a diagram illustrating online and offline computations performed by a system for recognizing mixed-content speech, in accordance with some embodiments.

FIG. 3 is a diagram illustrating online and offline computations performed by a system for recognizing mixed-content speech, in accordance with some embodiments. As shown in FIG. 3, various models may be created (e.g., trained) offline for subsequent use in recognition of mixed-content speech. For example, in some embodiments, one or more acoustic models, one or more tagged language models, one or more filler models, and/or one or more domain-specific recognizers (e.g., one or more domain-specific grammars) may be created for subsequent use for recognizing mixed content speech. In some embodiments, the filler model(s) and/or the domain-specific recognizer(s) may be trained at least in part by using training data comprising corresponding domain-specific content. In some embodiments, the tagged language model(s) may be trained at least in part by using one or more text corpora annotated with indications of which portions of the text correspond to domain-specific content.

The above-described model(s), which may be created offline, may subsequently be used for recognizing speech input. In some embodiments, speech input may be obtained and speech features obtained from the speech input may be used in the first speech processing pass. Performing a first speech processing pass may comprise using some (or all) of acoustic model(s), tagged language model(s), and filler model(s) created offline. Results of the first speech recognition pass may be used to perform a second speech recognition pass. Performing the second recognition pass may comprise using one or more of the domain-specific recognizers and/or acoustic model(s) created offline. For example, a domain-specific recognizer corresponding to a domain-specific vocabulary identified by at least one tag in the first speech recognition pass results may be used to perform the second speech recognition pass.

As previously described, the multi-pass speech recognition techniques described herein may be implemented in a distributed manner, such that the first speech processing pass is performed at a first location and a second speech processing pass is performed at a second location. This is further illustrated in FIG. 4, which is a diagram of illustrative network environment 400 in which embodiments described herein may operate in any of a number of suitable configurations.

Environment 400 generally includes networks 408, which may be a network of any type and/or a combination of multiple networks of any type, having devices connected to and accessible via network 408 either wirelessly and/or via wired connection(s). In the illustrative environment 400, user 402 may provide speech input to device 404. Device 404 may be any suitable mobile device including, but not limited to, a mobile phone (e.g., a cellular phone), a mobile smart phone, a personal digital assistant (PDA), a laptop computer, a table computer, or any other mobile device configured to receive speech input from user 402. In other embodiments, device 404 may be a fixed electronic device such as a desktop computer, a server, a rack-mounted computer, or any other suitable fixed electronic device configured to receive speech input from user 402.

User 402 may provide speech input to any suitable application program(s) and/or operating system(s) executing on device 404. For example, the speech input may be provided to a virtual assistant executing on the device, a word-processing application program, a web-browser application program, a dictation application program, a media player application program, a calendar application program, and/or any other suitable application program configured to receive speech input. User 402 may provide mixed-content speech including natural language content and domain-specific content, some examples of which have been described herein.

Figure 4:
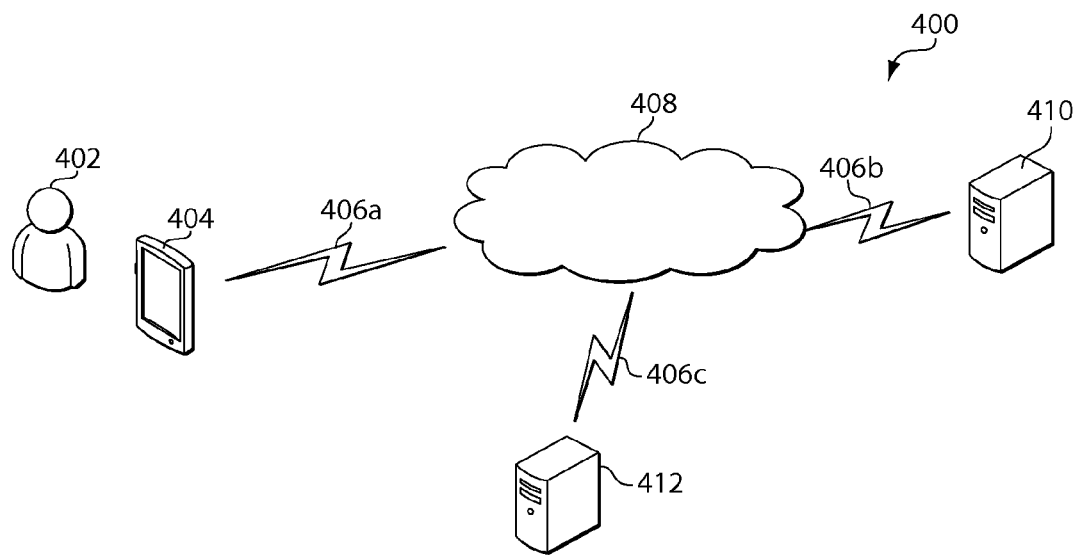
FIG. 4 shows an illustrative environment in which some embodiments described herein may operate.

As detailed below, multi-pass recognition of mixed-content speech input provided by user 402 (or speech input obtained in any other suitable way) may be performed exclusively by device 404, or may be performed by using one or more other computing devices communicatively coupled to device 404 (e.g., server 410 and/or domain-specific device 412, illustrated in FIG. 4). Multi-pass recognition of mixed-content speech may also be performed at least in part by device 404 and at least in part by one or more other computing devices communicatively coupled to device 404, or performed exclusively by one or more other computing devices communicatively coupled to device 404 (in which case device 404 may operate as an interface to resources distributed over the network).

As discussed above, device 404, server 410, and domain-specific device 412 are communicatively coupled via network 408 (which may be any suitable type of network such as one or more local area networks (LANs), one or more wide area networks (WANs) such as the Internet, one or more private networks, one or more device-to-device wireless connections, etc., or any combination thereof), and may communicate via wired or wireless connections, denoted generically as connections 406*a-c*. It should be appreciated that device 404, server 410, and domain-specific device 412 may represent a single or multiple such devices.

As discussed above, device 404 may fully perform recognition of speech input provided by user 402. Device 404 may be configured to recognize the speech input in accordance with the multi-pass speech recognition techniques described herein. For example, device 404 may be configured to perform the first speech processing pass and the second speech processing pass, to recognize mixed-content speech from the user. To this end, device 404 may be configured to use at least one tagged language model and at least one filler model to perform the first speech processing pass and at least one recognizer adapted to recognize domain-specific content (e.g., a grammar-based recognizer associated with domain-specific content, a recognizer trained at least in part using training data comprising domain-specific content, etc.) to perform the second speech processing pass.

In some embodiments, device 404 may comprise multiple computer hardware processors and may use different processors to perform the first and second speech processing passes. For example, device 404 may comprise and use one or more generally higher performance computer hardware processor(s) to perform the first speech processing pass and generally lower performance computer hardware processor(s) to perform the second speech processing pass.

In some embodiments, one or more computing devices other than computing device 404 may perform multi-pass recognition of mixed-content speech input provided by user 402. Device 404 may be configured to send a representation of the speech input (e.g., digitized acoustic waveform(s), speech recognition features derived from the speech input, etc.) to one or more other computing devices. For example, device 404 may be communicatively coupled to server 410 and/or to domain-specific device 412 (e.g., a speech-enabled navigation unit, a speech-enabled media player, a speech-enabled appliance such as a television, a laptop computer, or any other suitable speech enabled device associated with a domain-specific vocabulary) by which device 404 provides a representation of the speech input to one or more of these devices to perform multi-pass recognition of mixed-content speech.

As such, server 410, domain-specific device 412, and/or any other suitable computing device(s) may perform at least part of a multi-pass recognition of mixed-content speech as described herein. For example, server 410 may be configured to perform the first speech processing pass and the second speech processing pass, both of which have been described above and return the recognition results to device 404. To this end, server 410 may be configured to use at least one tagged language model and at least one filler model to perform the first speech processing pass and at least one recognizer adapted to recognize domain-specific content (e.g., a grammar associated with domain-specific content, a recognizer trained at least in part using training data comprising domain-specific content, etc.) to perform the second speech processing pass.

According to some embodiments, the first speech processing pass may be performed by server 410 (e.g., by employing one or more tagged language models and one or more filler models), and domain-specific device 412 may perform the second speech processing pass (e.g., using one or more domain-specific recognizers). As a result, domain-specific recognizers located on one or more domain-specific devices may be utilized to facilitate mixed-content speech recognition. It should be appreciated that the above described distributed speech recognition may be extended to multiple domains, wherein an ASR system (e.g., located on server 410 or device 404) is configured to perform a first speech processing pass to identify portions that may contain domain specific content from multiple different domains, and may provide first pass results to respective domain-specific devices when content from the corresponding domain is identified in the first speech processing pass. The corresponding domain-specific device(s) can then perform a second speech processing pass to recognize the identified domain-specific content. The one or more second pass results may then be combined (e.g., by device 404, server 410 or another device) to produce the recognition of the mixed-content speech, which can include content from multiple domains.

As discussed above, recognition of speech input provided by user 402 may be performed at least in part by device 404 and at least in part by one or more other computing devices (e.g., server 410, domain-specific device 412, etc.). As such, device 404 and one or more other computing devices may cooperatively perform any multi-pass speech recognition techniques described herein. For example, device 404 may perform a first speech processing pass and provide first pass results to a domain-specific device 412 that is configured to recognize corresponding domain-specific content (e.g., a speech-enabled navigation device, a speech-enabled media player, a speech-enabled smart appliance, etc., that may include one or more grammars associated with the respective domain-specific content and/or that includes a recognizer trained at least in part using training data comprising the respective domain-specific content) to perform the second speech processing pass. In this manner, device 404, for example a smart phone, may utilize the domain-specific recognizers on domain-specific devices to perform mixed-content speech recognition.

It should be appreciated that distributed computing resources may be utilized cooperatively in any manner and/or configuration to facilitate generally distributed multi-pass recognition of mixed-content speech. By doing so, network resources may be optimally utilized. For example, network resources (e.g., server 410) may perform generally computationally expensive large vocabulary recognition with tagging in a first speech processing pass and devices that have specifically tailored recognizers may be utilized to recognize corresponding domain-specific content in a second speech processing pass.

Figure 5:
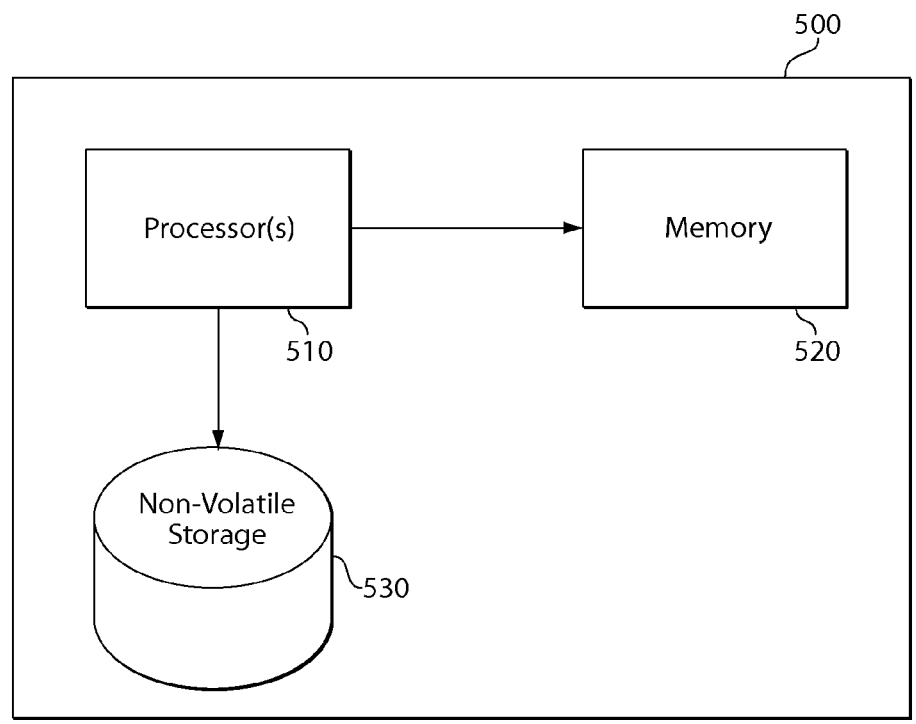
FIG. 5 is a block diagram of an illustrative computer system on which embodiments described herein may be implemented.

An illustrative implementation of a computer system 500 that may be used to implement one or more techniques described herein is shown in FIG. 5. Computer system 500 may include one or more processors 510 and one or more non-transitory computer-readable storage media (e.g., memory 520 and one or more non-volatile storage media 530). The processor 510 may control writing data to and reading data from the memory 520 and the non-volatile storage device 530 in any suitable manner, as the aspects of the invention described herein are not limited in this respect. Processor 510, for example, may be a processor on a mobile device, one or more servers, one or more domain-specific devices, etc.

To perform functionality and/or techniques described herein, the processor(s) 510 may execute one or more instructions stored in one or more computer-readable storage media (e.g., the memory 520, storage media, etc.), which may serve as non-transitory computer-readable storage media storing instructions for execution by processor(s) 510. Computer system 500 may also include any other processor, controller, or control unit needed to route data, perform computations, perform I/O functionality, etc. For example, computer system 500 may include any number and type of input functionality to receive data and/or may include any number and type of output functionality to provide data, and may include control apparatus to perform I/O functionality.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, such as process 100 described with reference to FIG. 1. The acts performed as part of each process may be ordered in any suitable way. Accordingly, embodiments may be constructed in which acts are performed in an order different than illustrated, which may include performing some acts concurrently, even though shown as sequential acts in illustrative embodiments.

All definitions, as defined and used herein, should be understood to control over dictionary definitions, and/or ordinary meanings of the defined terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. At least one non-transitory computer readable medium storing instructions that, when executed by at least one processor, cause at least one computer to perform a method of recognizing speech that comprises natural language and at least one word specified in at least one domain-specific vocabulary including a first domain-specific vocabulary, the method comprising:

performing a first speech processing pass comprising:
    identifying, in the speech, a first portion including the natural language and a second portion including the at least one word specified in the at least one domain-specific vocabulary, the identifying comprising using at least one filler model including a first filler model to assist in identifying the second portion,
        wherein the first filler model is trained, at least in part, on data in the first domain-specific vocabulary,
        wherein the at least one filler model comprises at least a first acoustic model, at least one morpheme model, at least one pronunciation model and/or at least one phoneme model,
        wherein identifying the second portion does not include attempting to recognize words in the second portion using a language model comprising language statistics for words in the at least one domain-specific vocabulary; and
    recognizing the first portion including the natural language using at least a second acoustic model and at least one language model; and
performing a second speech processing pass comprising:
    recognizing the second portion including the at least one word specified in the at least one domain-specific vocabulary.

2. The at least one non-transitory computer readable medium of claim 1, wherein performing the first speech processing pass comprises:
using at least one language model representing probabilities of transitioning from one or more words to one or more classes corresponding to the at least one domain-specific vocabulary and/or representing probabilities of transitioning from the one or more classes to the one or more words to recognize the first portion including the natural language.

3. The at least one non-transitory computer readable medium of claim 2, wherein performing the first speech processing pass results in at least one recognized word from the first portion including the natural language and at least one tag associated with the at least one domain-specific vocabulary to identify the second portion, and wherein performing the second speech processing pass comprises recognizing the second portion identified by the at least one tag.

4. The at least one non-transitory computer readable medium of claim 2, wherein performing the second speech processing pass comprises recognizing a portion having words specified in the first domain-specific vocabulary using at least one grammar associated with the first domain-specific vocabulary.

5. The at least one non-transitory computer readable medium of claim 2, wherein the at least one filler model includes at least one phoneme model to determine phoneme likelihoods in the second portion, the at least one phoneme model including a phoneme loop model and/or a phoneme N-gram model.

6. The at least one non-transitory computer readable medium of claim 1, wherein the first speech processing pass is performed at a first location on a network and the second speech processing pass is performed at a second location on the network, wherein the first location is different from the second location.

7. The at least one non-transitory computer readable medium of claim 2, wherein the second portion including the at least one word specified in the at least one domain-specific vocabulary includes a third portion including at least one word specified in a first domain-specific vocabulary and a fourth portion including at least one word specified in a second domain-specific vocabulary, wherein the at least one filler model further includes a second filler model trained at least in part on data in the second domain-specific vocabulary, and wherein performing the second speech processing pass comprises:
using a first domain-specific speech recognizer adapted to recognize words in the first domain-specific vocabulary to recognize the third portion identified at least in part using the first filler model; and
using a second domain-specific recognizer adapted to recognize words in the second domain-specific vocabulary to recognize the fourth portion identified at least in part using the second filler model.

8. A system comprising at least one computer for recognizing speech that comprises natural language and at least one word specified in at least one domain-specific vocabulary including a first domain-specific vocabulary, the system comprising:
at least one computer readable medium storing instructions; and
at least one processor programmed by executing the instructions to perform:
    a first speech processing pass comprising:
        identifying, in the speech, a first portion including the natural language and a second portion including the at least one word specified in the at least one domain-specific vocabulary, the identifying comprising using at least one filler model including a first filler model to assist in identifying the second portion,
            wherein the first filler model is trained, at least in part, on data in the first domain-specific vocabulary,
            wherein the at least one filler model comprises at least a first acoustic model, at least one morpheme model, at least one pronunciation model and/or at least one phoneme model,
            wherein identifying the second portion does not include attempting to recognize words in the second portion using a language model comprising language statistics for words in the at least one domain-specific vocabulary; and
        recognizing the first portion including the natural language using at least a second acoustic model and at least one language model; and
    a second speech processing pass comprising:
        recognizing the second portion including the at least one word specified in the at least one domain-specific vocabulary.

9. The system of claim 8, wherein the at least one processor is programmed to perform the first speech processing pass further comprising:
using at least one language model representing probabilities of transitioning from one or more words to one or more classes corresponding to the at least one domain-specific vocabulary and/or representing probabilities of transitioning from the one or more classes to the one or more words to recognize the first portion including the natural language.

10. The system of claim 9, wherein performing the first speech processing pass results in at least one recognized word from the first portion including the natural language and at least one tag associated with the at least one domain-specific vocabulary to identify the second portion, and wherein performing the second speech processing pass comprises recognizing the second portion identified by the at least one tag.

11. The system of claim 9, wherein the at least one processor is programmed to perform the second speech processing pass comprising recognizing a portion having words specified in the first domain-specific vocabulary using at least one grammar associated with the first domain-specific vocabulary.

12. The system of claim 9, wherein the at least one filler model includes at least one phoneme model to determine phoneme likelihoods in the second portion, the at least one phoneme model including a phoneme loop model and/or a phoneme N-gram model.

13. The system of claim 8, wherein the first speech processing pass is performed at a first location on a network and the second speech processing pass is performed at a second location on the network, wherein the first location is different from the second location.

14. A method for recognizing speech that comprises natural language and at least one word specified in at least one domain-specific vocabulary including a first domain-specific vocabulary, the method comprising:
  performing a first speech processing pass comprising:
    identifying, in the speech, a first portion including the natural language and a second portion including the at least one word specified in the at least one domain-specific vocabulary, the identifying comprising using at least one filler model including a first filler model to assist in identifying the second portion,
      wherein the first filler model is trained, at least in part, on data in the first domain-specific vocabulary,
      wherein the at least one filler model comprises at least a first acoustic model, at least one morpheme model, at least one pronunciation model and/or at least one phoneme model,
      wherein identifying the second portion does not include attempting to recognize words in the second portion using a language model comprising language statistics for words in the at least one domain-specific vocabulary; and
    recognizing the first portion including the natural language using at least a second acoustic model and at least one language model; and
  performing a second speech processing pass comprising:
    recognizing the second portion including the at least one word specified in the at least one domain-specific vocabulary.

15. The method of claim 14, wherein performing the first speech processing pass comprises:
  using at least one language model representing probabilities of transitioning from one or more words to one or more classes corresponding to the at least one domain-specific vocabulary and/or representing probabilities of transitioning from the one or more classes to the one or more words to recognize the first portion including the natural language.

16. The method of claim 15, wherein performing the first speech processing pass results in at least one recognized word from the first portion including the natural language and at least one tag associated with the at least one domain-specific vocabulary to identify the second portion, and wherein performing the second speech processing pass comprises recognizing the second portion identified by the at least one tag.

17. The method of claim 15, wherein performing the second speech processing pass comprises recognizing a portion having words specified in the first domain-specific vocabulary using at least one grammar associated with the first domain-specific vocabulary.

18. The method of claim 15, wherein the at least one filler model includes at least one phoneme model to determine phoneme likelihoods in the second portion, the at least one phoneme model including a phoneme loop model and/or a phoneme N-gram model.

19. The method of claim 14, wherein the first speech processing pass is performed at a first location on a network and the second speech processing pass is performed at a second location on the network, wherein the first location is different from the second location.

20. The method of claim 15, wherein the second portion including the at least one word specified in the at least one domain-specific vocabulary includes a third portion including at least one word specified in a first domain-specific vocabulary and a fourth portion including at least one word specified in a second domain-specific vocabulary, wherein the at least one filler model further includes a second filler model trained at least in part on data in the second domain-specific vocabulary, and wherein performing the second speech processing pass comprises:
  using a first domain-specific speech recognizer adapted to recognize words in the first domain-specific vocabulary to recognize the third portion identified at least in part using the first filler model; and
  using a second domain-specific recognizer adapted to recognize words in the second domain-specific vocabulary to recognize the fourth portion identified at least in part using the second filler model.

* * * * *